(12) United States Patent
Liu

(10) Patent No.: US 8,456,706 B2
(45) Date of Patent: Jun. 4, 2013

(54) METHOD AND APPARATUS FOR CHARACTERIZING PRINTER STREAKING

(75) Inventor: Juan Liu, Milpitas, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 331 days.

(21) Appl. No.: 12/849,863

(22) Filed: Aug. 4, 2010

(65) Prior Publication Data

US 2012/0033238 A1     Feb. 9, 2012

(51) Int. Cl.
- *G06F 15/00* (2006.01)
- *H04N 1/409* (2006.01)
- *G06K 9/40* (2006.01)
- *G06K 9/46* (2006.01)

(52) U.S. Cl.
USPC ............ 358/1.9; 358/3.26; 382/275; 382/191

(58) Field of Classification Search
None
See application file for complete search history.

(56) References Cited

U.S. PATENT DOCUMENTS

| | | | |
|---|---|---|---|
| 5,305,119 A | 4/1994 | Rolleston et al. | |
| 5,528,270 A * | 6/1996 | Tajika et al. | 347/19 |
| 5,528,386 A | 6/1996 | Rolleston et al. | |
| 5,612,902 A | 3/1997 | Stokes | |
| 5,818,960 A | 10/1998 | Gregory, Jr. et al. | |
| 6,005,670 A | 12/1999 | Coleman | |
| 6,304,278 B1 | 10/2001 | Coleman | |
| 6,341,020 B1 | 1/2002 | Rumph et al. | |
| 6,393,161 B1 * | 5/2002 | Stevenson et al. | 382/275 |
| 6,522,431 B1 | 2/2003 | Pitts et al. | |
| 6,571,000 B1 | 5/2003 | Rasmussen et al. | |
| 6,809,837 B1 | 10/2004 | Mestha et al. | |
| 6,972,783 B2 | 12/2005 | Takamatsu et al. | |
| 7,305,194 B2 | 12/2007 | Thayer | |
| 7,347,525 B2 | 3/2008 | Mizes | |
| 7,388,989 B2 | 6/2008 | Wang | |
| 7,424,169 B2 | 9/2008 | Viassolo et al. | |
| 7,433,539 B2 | 10/2008 | Wang et al. | |
| 7,528,997 B2 | 5/2009 | Gusmano et al. | |
| 7,542,171 B2 | 6/2009 | Viassolo et al. | |
| 7,643,678 B2 | 1/2010 | Mizes | |
| 2001/0016054 A1 * | 8/2001 | Banker et al. | 382/112 |
| 2002/0149785 A1 * | 10/2002 | Chu et al. | 358/1.9 |
| 2005/0036705 A1 | 2/2005 | Viassolo et al. | |
| 2005/0254097 A1 | 11/2005 | Schweid et al. | |
| 2006/0001911 A1 | 1/2006 | Viassolo et al. | |
| 2006/0077488 A1 | 4/2006 | Zhang et al. | |
| 2006/0110060 A1 | 5/2006 | Wang et al. | |
| 2006/0209101 A1 * | 9/2006 | Mizes | 347/2 |
| 2008/0239344 A1 | 10/2008 | Wang et al. | |
| 2009/0003729 A1 | 1/2009 | Metcalfe et al. | |

(Continued)

OTHER PUBLICATIONS

Gaurav Sharma, Wencheng Wu, Edul N. Dalal, "The CIEDE2000 Color-Difference Formula: Implementation Notes, Supplementary Test Data, and Mathematical Observations", Submitted to Color Reserach and Application, Feb. 9, 2004.

(Continued)

*Primary Examiner* — Marivelisse Santiago Cordero
*Assistant Examiner* — Daryl Jackson
(74) *Attorney, Agent, or Firm* — Fay Sharpe LLP

(57) ABSTRACT

Methods and systems are presented for characterizing printer streaking using a basis selection algorithm to determine parameters set for a streak template that best approximate a density profile derived from a scanned printed test image, with wavelet decomposition used to expedite the searching for position and width parameters.

24 Claims, 14 Drawing Sheets

U.S. PATENT DOCUMENTS

| | | | | |
|---|---|---|---|---|
| 2009/0046325 | A1* | 2/2009 | Paul et al. | 358/3.26 |
| 2009/0244575 | A1* | 10/2009 | Sasayama | 358/1.9 |
| 2009/0273813 | A1 | 11/2009 | Viturro et al. | |
| 2009/0284762 | A1* | 11/2009 | Zhang et al. | 358/1.9 |
| 2009/0296158 | A1 | 12/2009 | Paul et al. | |
| 2010/0085603 | A1* | 4/2010 | Bernal et al. | 358/2.1 |
| 2010/0092096 | A1 | 4/2010 | Bernal et al. | |
| 2010/0149560 | A1* | 6/2010 | Wu | 358/1.9 |
| 2010/0214580 | A1* | 8/2010 | Burry et al. | 358/1.9 |
| 2010/0220363 | A1* | 9/2010 | Paul et al. | 358/3.26 |

OTHER PUBLICATIONS

Gaurva Sharma, Digital Color Imaging Handbook, CRC Press.

Swati Bandyopadhyay, Tapan Paul, Tapasi Roychowdhury and Sivaji Bandyopadhyay, "A new model of printer characterization", IS&T's NIP20: 2004 International Conference on Digital Printing Technologies.

Raja Balasubramanian, the use of spectral regression in modeling halftone color printers, Journal of Electric Imaging, Apr. 1999, vol. 8(2).

Raja Balasubraman Ian, "Colorimetric modeling of binary color printers", pp. 1-4.

Jon Yngve Hardeberg and Francis Schmitt, Color Printer characterization using a computational geometry approach.

Raja Balasubramanian, "A spectral neugebauer model for dot-on-dot printers," pp. 1-11.

De Kleer, J., & Williams, B.C. (1987). "Diagnosing Multiple Faults", Artificial Intelligence (32), 97-130.

Duke, C.B., Noolandi, J., & Thieret, T. (2002). The surface science of xerography. Surface Science (500), 1005-1023.

Liu, J., De Kleer, J. Kuhn, L., Price, B., Zhou, R., & Uckun, S. (2008). "A unified information criterion for evaluating probe and test selection". In International Conference on Prognostics and Health Management (PHM).

Rasmussen, D. R., Dalal, E.N., & Hoffman, K.M. (2001). "Measurement of macro-uniformity: streaks, bands, mottle and chromatic variations". In IS&T's 2001 PICS Conference Proceedings.

Rosario, H. S., Saber, E., Wu, W., & Chandu, K. (2007). "A novel algorithm for detecting streaks in mottled and noisy images", Journal of Electronic Imaging, 16.

S. Mallat and Z. Zhang, "Matching pursuits with time-frequency dictionaries", IEEE Trans. Signal Processing, vol. 41, pp. 3397-3415, Dec. 1993.

S. Chen and D. Donoho, "Basis pursuit", in Proc. $28^{th}$ Asilomar Conf. Signals, System Computation, (Asilomar, CA), pp. 41-44, 1994.

P.S. Huggins and S.W. Zucker, "Greedy basis pursuit", IEEE Trans. Signal Processing, vol. 55, pp. 3760-3772, Jul. 2007.

P. Du, W. A. Kibbe, and S.M. Lin, "Improved peak detection in mass spectrum by incorporating continuous wavelet transform-based pattern matching", Bioinfomatics, vol. 22, No. 17, 2006.

J. Liu and P. Moulin, "Complexity-regularized image denoising", in Proc. of ICIP '97, (Santa Barbara, CA), pp. II. 370-373, Oct. 1997.

\* cited by examiner

METHOD AND APPARATUS FOR CHARACTERIZING PRINTER STREAKING

BACKGROUND

The present disclosure is generally related to the field of printing systems, and more particularly to techniques and apparatus for characterizing printer streaks. Printer defects often show up as image quality artifacts such as banding and streaks. As printed media traverses through a printer along a process direction, banding and other periodic defects appear as lines along the cross-process direction, while streaking defects extend along the process direction. The causes for banding and streaking are different, and diagnosing the underlying causes of streaking has thusfar been difficult. Previous work on printer streaking has largely focused on streak detection, which required a design engineer to predefine the attributes for streaks that are of interest. In practice, this technique is limited to detecting a few streak types and more robust diagnosis and generic analysis of a broad range of defects found in printers suffering from streaking is impossible absent a fuller characterization of streaks found on a printed page.

BRIEF DESCRIPTION

The present disclosure provides efficient, automated streak characterization techniques and systems for interpreting scanned images using basis selection algorithms such as a matching pursuit algorithm to progressively identify and characterize dominant streaks in signal profiles. The technique can be further improved by use of wavelet decomposition to speed up the basis selection process and reduce computation complexity.

A method is provided for characterizing printer streaks, which includes printing a test image on a sheet or other printable media and scanning or otherwise measuring the image to generate a characterization data set representing measurements of intensity (for black-and-white prints) or color (for color prints) values observed from the test image, and a density profile is generated using the characterization data set that represents intensity or color value variation of the test image in the cross-process direction. In certain embodiments, the density profile is generated by averaging or integrating the characterization data set along the process direction. A descriptor parameter set is determined for a streak template that best approximates the density profile using a basis selection algorithm. The parameter set includes location and width parameters along the cross-process direction, as well as an intensity parameter describing how noticeable the streak is. Various basis selection algorithms can be used, such as a matching pursuit basis selection algorithm or a basis pursuit algorithm in certain embodiments. The density profile is updated according to the streak template and the descriptor parameter set, and the method further includes iteratively determining further descriptor parameter sets and further updating the density profile. A printer streak characterization is generated according to the streak template and the descriptor parameter sets.

In certain embodiments, wavelet decomposition is used in determining the approximate value of the descriptor parameter sets. Discrete wavelet decomposition (discrete wavelet transform or DWT) is performed using the density profile, and the wavelet coefficients suggest search ranges for the location and width parameters along the cross-process direction. The basis selection algorithm then restricts its search to the search range identified above. The wavelet decomposition in certain embodiments includes computing a projection of the density profile onto the wavelet function, for example, using the formula $\psi(2^k(t-\tau))$, where $\psi(t)$ is the wavelet function (124d), t and $\tau$ are discrete, and k is a decomposition level corresponding to a scale or width of $2^k$. In certain embodiments, moreover, the wavelet function has a shape that is similar to the streak template, for example, where the streak template is a raised cosine shape and the wavelet function has a Mexican hat shape.

In certain embodiments, the printer streak characterization includes estimates of a plurality of printer streaks individually characterized by a corresponding one of the descriptor parameter sets. In certain embodiments, the streak estimates are characterized as $h_i x(a_i t - \tau_i)$, where $\tau_1$ is the location parameter and $\alpha_i$ is the width parameter along the cross-process direction, $h_i$ is the intensity parameter at the location $\tau_i$ and $x(t)$ is the streak template.

A printer streak characterization system is provided for characterizing printer streaks. The characterization system includes a memory storing a characterization data set representing measurements of intensity or color values observed from a test image printed in a printable media, as well as a processor operative to generate a density profile using the characterization data set, where the density profile represents intensity or color value variation of the test image in the cross-process direction. The processor determines a descriptor parameter set for a streak template that best approximates the density profile using a basis selection algorithm, such as a matching pursuit algorithm, where the descriptor parameter set includes location and width parameters along the cross-process direction, as well as a intensity or color value variation intensity parameter. The processor is operative to update the density profile according to the streak template and the descriptor parameter set, and to iteratively determine further descriptor parameter sets and further update the density profile, and to generate a printer streak characterization according to the streak template and the descriptor parameter sets.

In certain embodiments, the memory and the processor are integrated into a printing system, and the printing system further includes one or more print engines operative to print the test image onto the printable media according to an input characterization data set, as well as a scanner or other means for measuring the test image to generate the characterization data set representing measurements of intensity or color values observed from the test image.

In certain embodiments, the processor is operative to determine the descriptor parameter set via discrete wavelet decomposition using the density profile and a wavelet function to generate search ranges for the location and width parameters along the cross-process direction, and the processor restricts the basis selection algorithm according to the location and width search ranges.

BRIEF DESCRIPTION OF THE DRAWINGS

The present subject matter may take form in various components and arrangements of components, and in various steps and arrangements of steps. The drawings are only for purposes of illustrating preferred embodiments and are not to be construed as limiting the subject matter.

DETAILED DESCRIPTION

Figure 1:
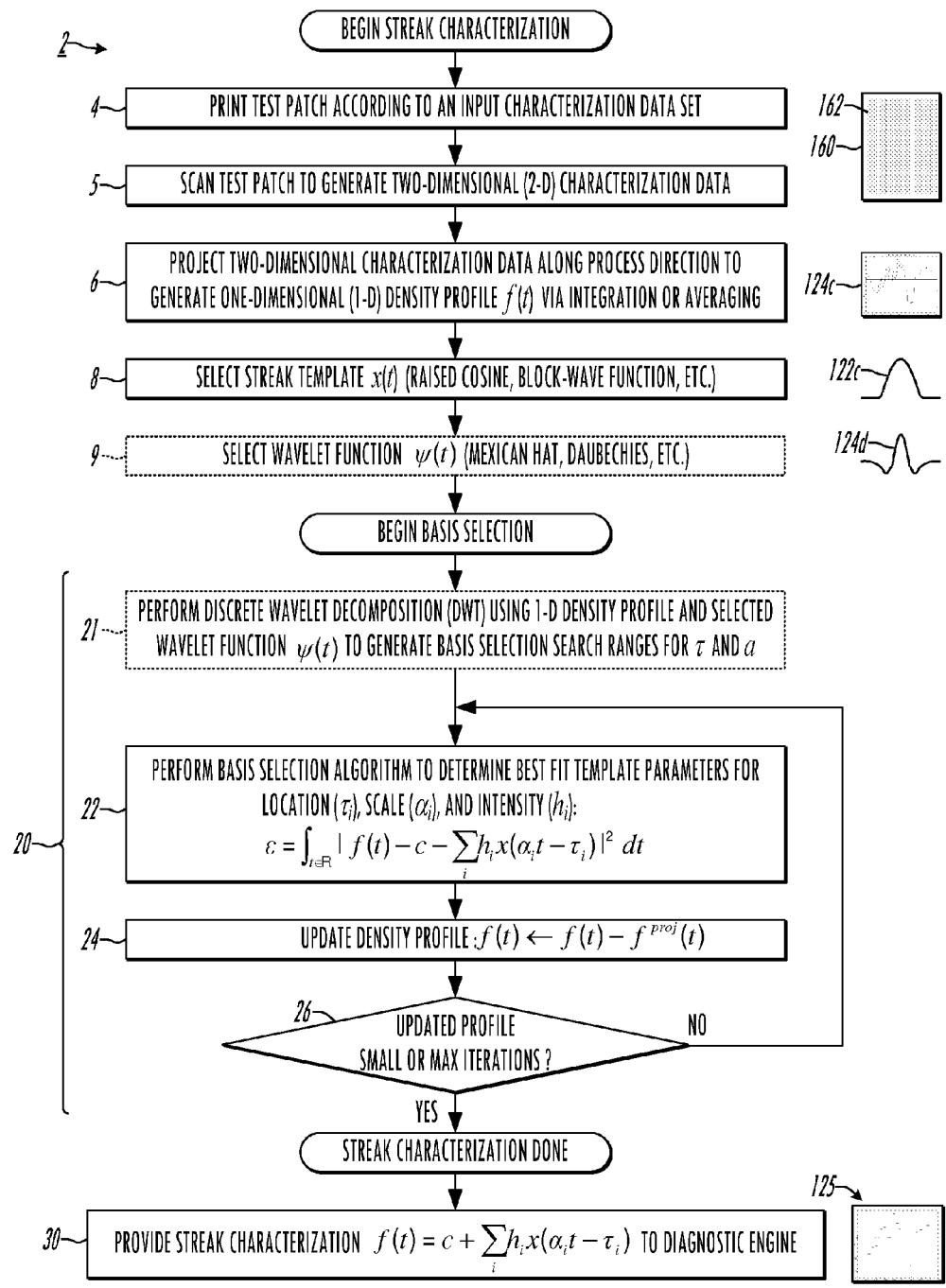
FIG. 1 is a flow diagram illustrating an exemplary printer streak characterization method in accordance with one or more aspects of the disclosure.
Figure 2:
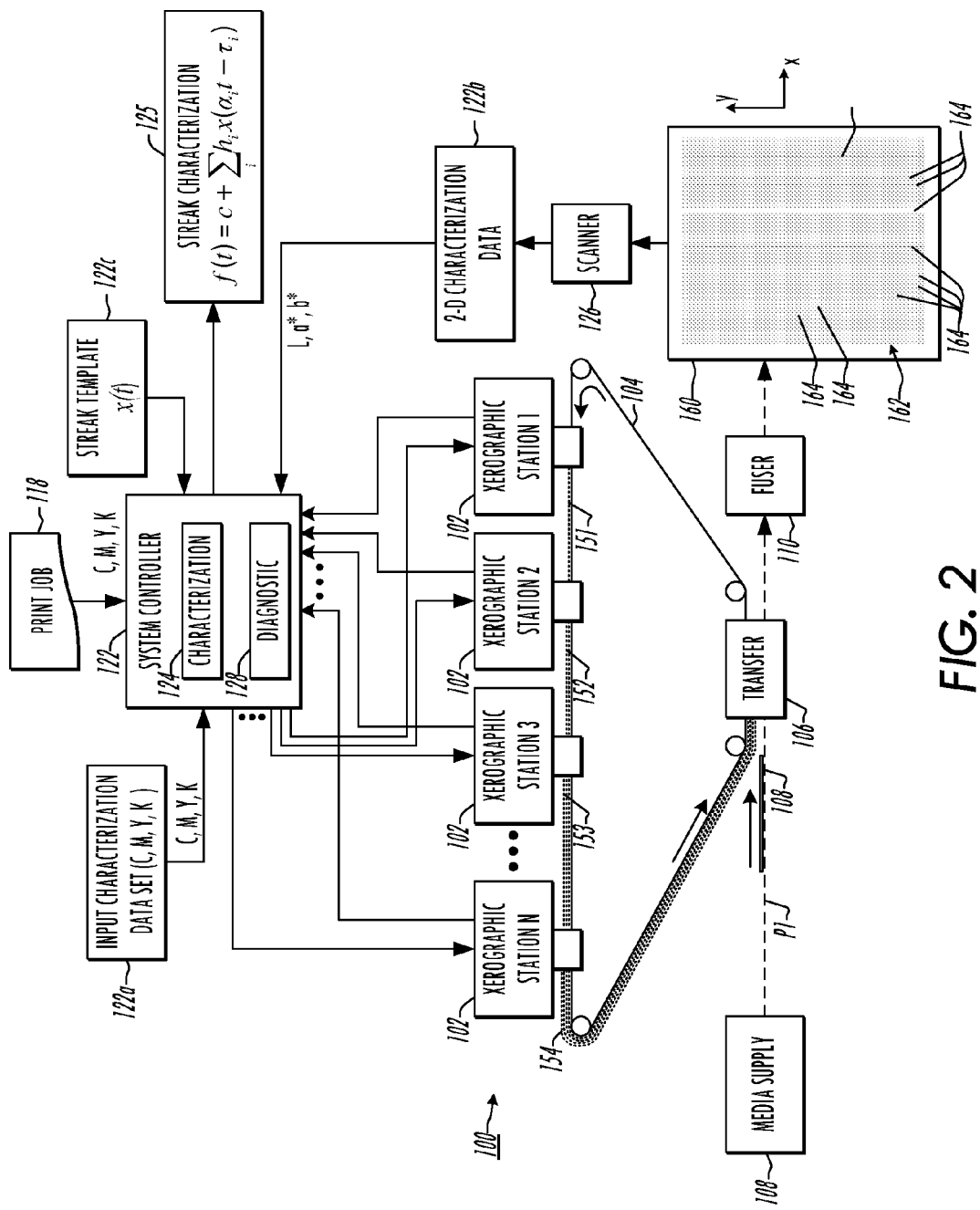
FIGS. 2 and 3 are simplified schematic system level diagram illustrating exemplary multi-color document processing systems with a printer streak characterization system in accordance with the disclosure.
Figure 3:
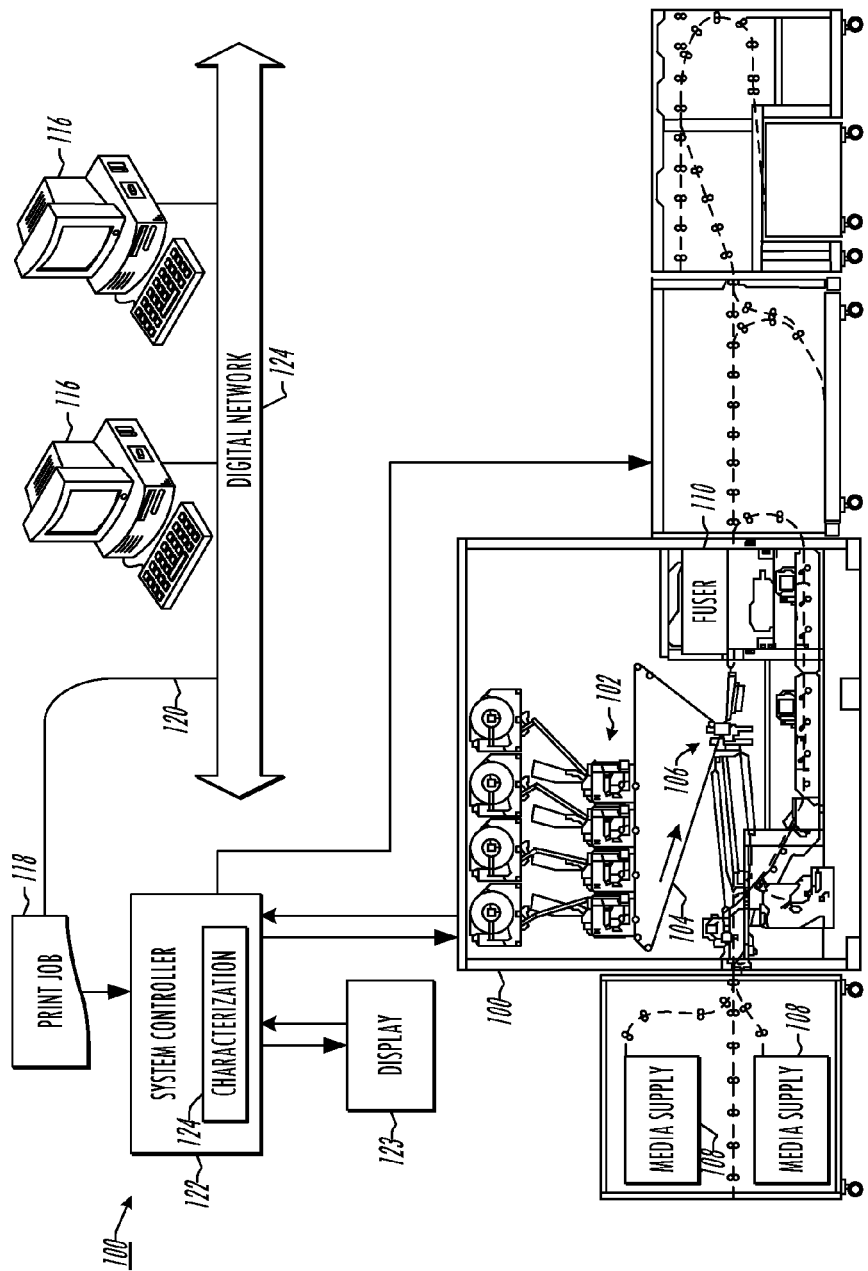
Figure 4:
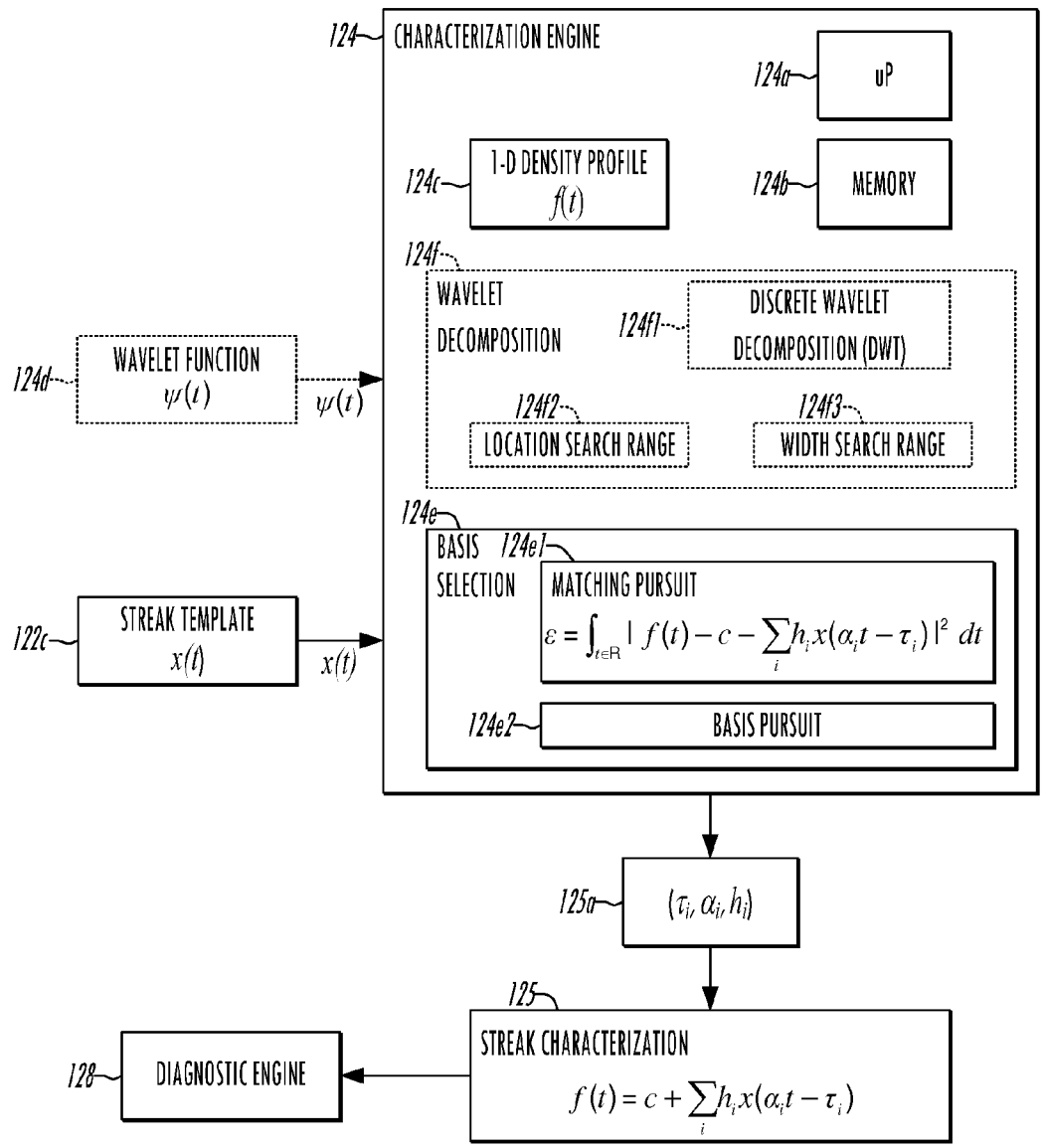
FIG. 4 is a schematic diagram illustrating further details of the streak characterization system of FIGS. 2 and 3 according to the disclosure.

Referring now to the drawings, methods and systems are provided for characterizing printer streaking using a basis selection algorithm, with further improvement in certain embodiments using discrete wavelet decomposition. FIG. 1 illustrates an exemplary color printer streak characterization process or method 2 that may be implemented in a characterization system 124 shown in FIGS. 2-4, where the characterization system 124 can be separate or may be integrated into a printing system 100. As seen in FIGS. 2-4, exemplary printing systems or devices 100 include system controllers 122 and streak characterization systems or engines 124 in which the method 2 may be implemented.

The exemplary color processing devices or printing systems 100 in FIGS. 2-4 include xerographic stations (print engines) 102 which operate to produce visible images according to input color data. The printing systems 100 also include a system controller 122 which provides input data to the print engines 102 according to a print job 118, as well as a scanner type sensor 126 that generates measured data 124b representative of the perceivable spectral content of printed visible images 162 printed onto printable media 108. The scanner 126 in certain embodiments may be integrated into the printing system 100 for in-line scanning of printed images 162 on test pages 160. The system 100 in FIG. 2 is a tandem multicolor document processing device with marking devices 102 individually operable according to control signals or data from the controller 122 to transfer toner marking material 151-154 onto an intermediate substrate 104 that may or may not be a photoreceptor, in this case, a shared intermediate transfer belt (ITB) 104 traveling in a counter clockwise direction in the figure past the xerographic marking devices 102 (also referred to as marking engines, marking elements, marking stations, etc.). In other embodiments, a cylindrical drum may be employed as an intermediate transfer substrate, with the marking devices 102 positioned around the periphery of the drum to selectively transfer marking material thereto. In addition, this could be used for other marking or display technologies, such as ink jet, DRT, LCD, projectors, etc.

FIG. 3 shows another exemplary system 100 having four marking devices 102 configured along a shared or common intermediate transfer belt 104, along with a transfer station 106, a supply of final print media 108, and a fuser 110. In normal operation, print jobs 118 are received at the controller 122 via an internal source such as an in-line or outboard scanner 126 (FIG. 2) and/or from an external source, such as one or more computers 116 connected to the system 100 via one or more networks 124 (FIG. 3) and associated cabling 120, or from wireless sources. The print job execution may include printing selected text, line graphics, images, magnetic ink character recognition (MICR) notation, etc., on the front and/or back sides or pages of one or more sheets of paper or other printable media. In this regard, some sheets 108 may be left completely blank in accordance with a particular print job 118, and some sheets may have mixed color and black-and-white printing. Execution of the print job 118, moreover, may include collating the finished sheets 108 in a certain order, along with specified folding, stapling, punching holes into, or otherwise physically manipulating or binding the sheets 108. In certain embodiments the system 100 may be a stand-alone printer or a cluster of networked or otherwise logically interconnected printers with an associated display 123 (FIG. 3), with each printer having its own associated print media source 108 and finishing components including a plurality of final media destinations, print consumable supply systems and other suitable components. Alternatively the system may include multiple marking engines 102 with a common media supply 108 and common finishers that are configured either serially or in parallel (separate parallel paper paths between feeding and finishing).

Referring also to FIG. 4, a characterization system or characterization engine 124 is operatively coupled with (and may be implemented integrally to) the system controller 122, and the controller 122 may further include a diagnostic component or engine 128 (FIGS. 2 and 4). In certain embodiments, the characterization system 124 is implemented as a processor-based system having suitable processing and memory components programmed or configured to implement the characterization process 2 and other functionality as described herein.

As best shown in FIG. 4, the characterization system 124 includes a processing element 124a and memory 124b and employs suitable program instructions and/or dedicated or programmable logic to perform the streak characterization functionality described herein, and may perform other tasks. In operation, the streak characterization system 124 receives a characterization data set 122a. In certain embodiments, the input characterization data set 122a is a uniform selected color or gray scale shade for printing one or more ideally uniform test patch images 162 onto a test page 160 (FIG. 2) for characterizing streaking problems in the printing system 100. Thus, for the case of no printer streaking or banding, the test patch 162 should appear on the printed test page 160 as a uniform patch. However, as shown in FIG. 2, if the printing system 100 suffers from one or more streak-causing problems, the printed test patch 162 includes one or more visible streaks 164 extending along the process direction (vertical streaks along the "y" direction in FIG. 2), where the streaks may be lighter or darker than the desired color or shade of the input characterization data set 122a, and may have different widths along a cross-process direction (e.g., the "x" direction in FIG. 2) which is transverse to the process-direction.

The scanner 126 (FIG. 2) scans the printed test image and provides a two-dimensional (2-D) measured characterization data set 122b which represents measurements of observed intensity or color. In the examples of FIGS. 2-4, the test patch 162 is measured using the scanner 126 to generate the measured characterization data set 124b, which is provided to the characterization system 124 as shown in FIG. 4.

Figure 14:
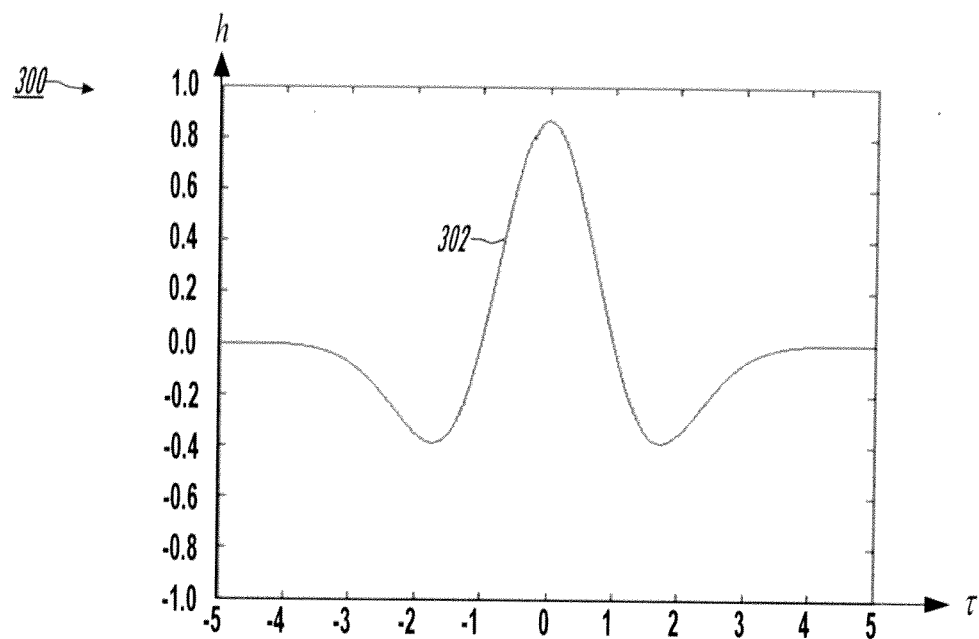
FIGS. 14 and 15 are graphs showing an exemplary Mexican hat and Daubechies-shaped wavelet functions.
Figure 15:
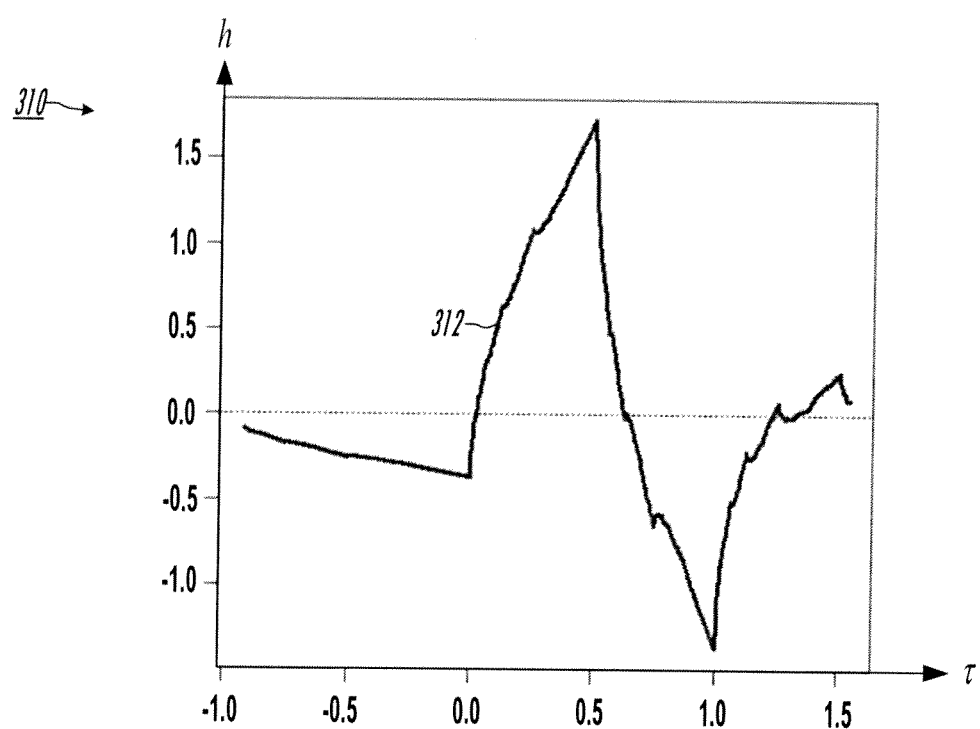

Referring to FIGS. 4, 14, and 15, the characterization system 124 in FIG. 4 is also provided with a streak template x(t)

Figure 5:
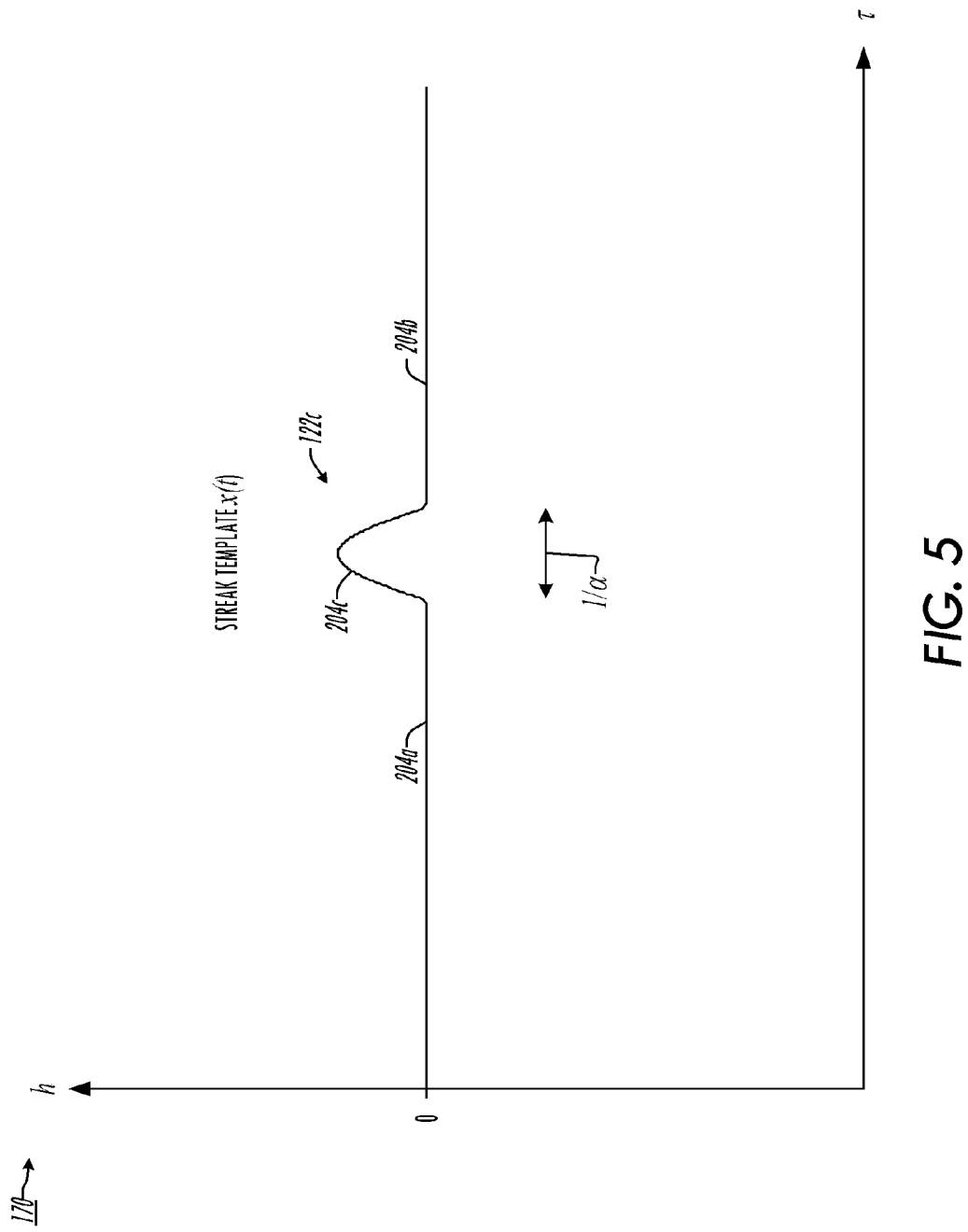
FIG. 5 is a graph showing an exemplary raised cosine shaped streak template.

122c (e.g., defining a template waveform such as a raised cosine or half-cosine shape as shown in FIG. 5, a block-wave function, or other shape), as well as an optional wavelet function wavelet function ψ(t) 124d for wavelet decomposition, such as a Mexican hat-shaped function (function 302 shown in graph 300 of FIG. 14), a Daubechies-shaped wavelet function (function 312 in graph 310 of FIG. 16), or other suitable function for performing optional wavelet decomposition. In certain embodiments, a wavelet function is selected which has a similar shape to that of the streak template x(t).

As best seen in FIG. 4, the characterization system 124 in certain embodiments includes various data and functional components that may be implemented using the processor 124a and the memory 124b, including a one-dimensional (1-D) density profile 124c derived from the 2-D measured characterization data set 122b using averaging or integration in certain embodiments and representing color value variation of the test image 162 in the cross-process direction (x) of the printing system 100, as well as a basis selection component 124e and an optional wavelet decomposition component 124f. The basis selection component 124 can implement one or more basis selection algorithms for determining descriptor parameter sets 125a (tuples (τ, α, h)) to characterize printer streaking using matching pursuit 124e1, basis pursuit 124e2, or other basis selection techniques. The optional wavelet decomposition component 124f includes a discrete wavelet decomposition component 124f1 (discrete wavelet transform or DWT) which can be advantageously employed in certain embodiments to expedite the basis selection by identifying location search ranges 124f2 and 124f3 for location and width parameters. The characterization system 124 provides a characterization 125 of printer streaking based on the tuples or sets 125a, which may then be provided to the diagnostic engine 128 as shown in FIG. 4.

Referring now to FIG. 1, the exemplary printer streak characterization method 2 is illustrated and described below in the form of a series of acts or events. However, the various methods of the disclosure are not limited by the illustrated ordering of such acts or events except as specifically set forth herein. In this regard, except as specifically provided hereinafter, some acts or events may occur in different order and/or concurrently with other acts or events apart from those illustrated and described herein, and not all illustrated steps may be required to implement a process or method in accordance with the present disclosure. The illustrated method 2, moreover, may be implemented in hardware, processor-executed software, or combinations thereof, whether in a single characterization system 124 or in distributed form in two or more components or systems, in order to characterize streaking in a printing device, and may be employed in conjunction with any form of printing system including without limitation desktop printers, network printers, stand-alone copiers, multi-function printer/copier/facsimile devices, high-speed printing/publishing systems digital printing presses, etc., wherein the disclosure is not limited to the specific applications and implementations illustrated and described herein.

As shown in FIG. 1, the streak characterization process 2 in FIG. 1 includes printing a test image 162 at 4 onto a printable media 108 according to the input characterization data set 122a using the printing system 100. For example, an operator in certain embodiments can print a preprogrammed test sheet 160 with one or more homogeneous half-toned color test patches 162. The test image 162 is measured (e.g., scanned) at 5 to generate the two-dimensional characterization data set 122b representing measurements of intensity or color values observed from the test image 162.

Figure 6:
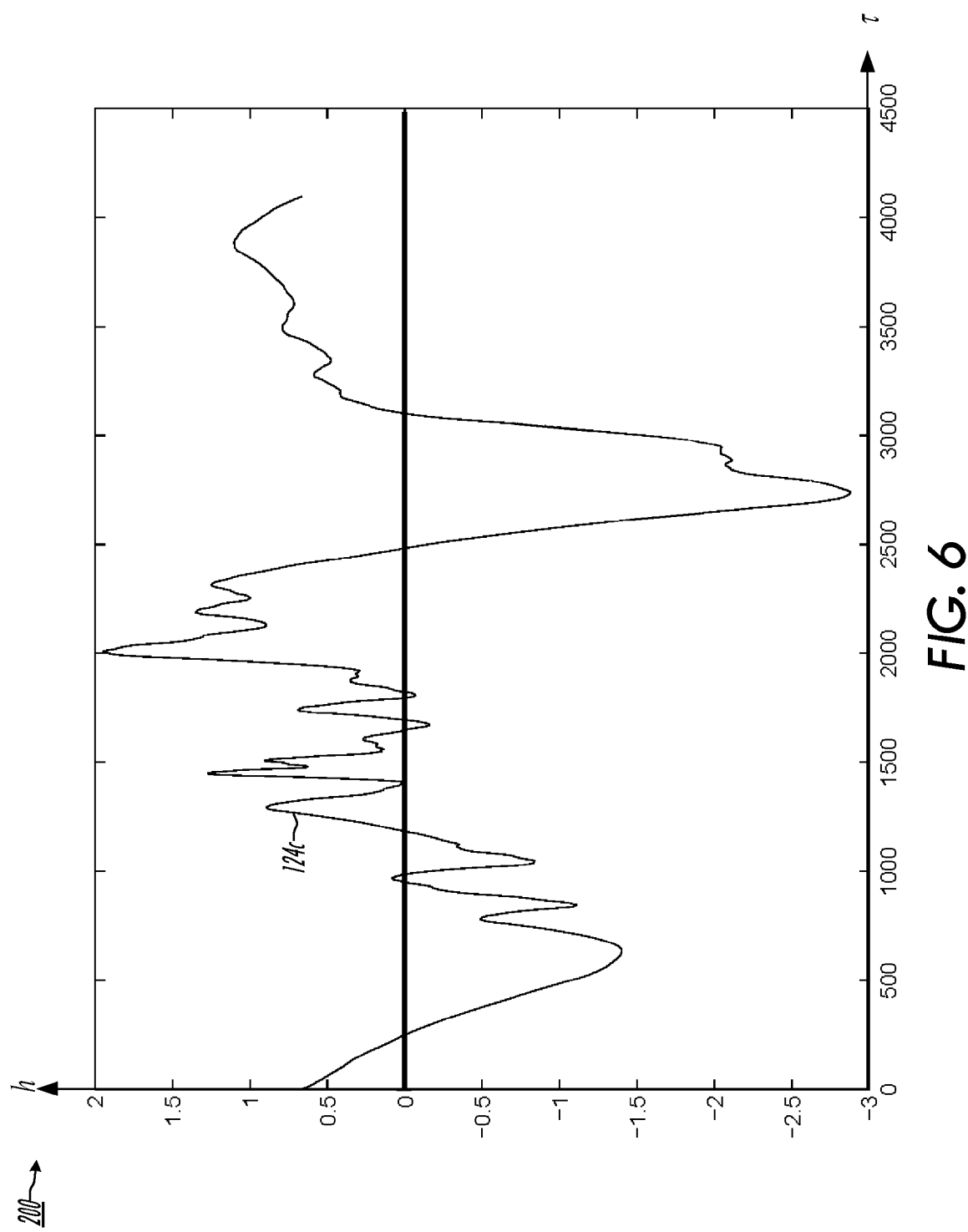
FIG. 6 is a graph showing an exemplary one-dimensional density profile for a scanned test page with an image having streaks along the process direction.

At 6, the system 124 uses integration, averaging, or other suitable mathematical projection techniques to generate the one-dimensional density profile 124c using the two-dimensional characterization data set 122b, where the generated density profile 124c represents color value variation of the test image 162 in a cross-process direction (x) transverse to a process direction (y) of the printing system 100. FIG. 6 illustrates a graph 200 with an exemplary one-dimensional density profile 124c for the scanned test page 160 of FIG. 2 with an image 162 having streaks 164 along the process direction (y). In this regard, for homogeneous test patches 162, streaks 164 generally run across the entire patch 162 in the process (y) direction as shown in FIG. 2, and the streaks 164 can be projected along the process direction via integration or averaging to reduce printed images to the 1-D signal (density profile) 142c which captures variation along the cross-process direction (x). The process 2 further includes selection of a streak template x(t) at 8 (template 122c in FIGS. 2 and 4, for example, the raised cosine template in FIG. 5). The template 122c may be selected by a user, for instance, based on general shape similarity to the streak characteristics if known, or the selection may be automated, or the streak template 122c may be preconfigured in the system 124. At 9 in FIG. 1, a wavelet function ψ(t) 124d is selected for wavelet decomposition (e.g., Mexican hat-shaped function 302 in FIG. 14, Daubechies-shaped wavelet function 312 in FIG. 16, etc.).

Figure 7:
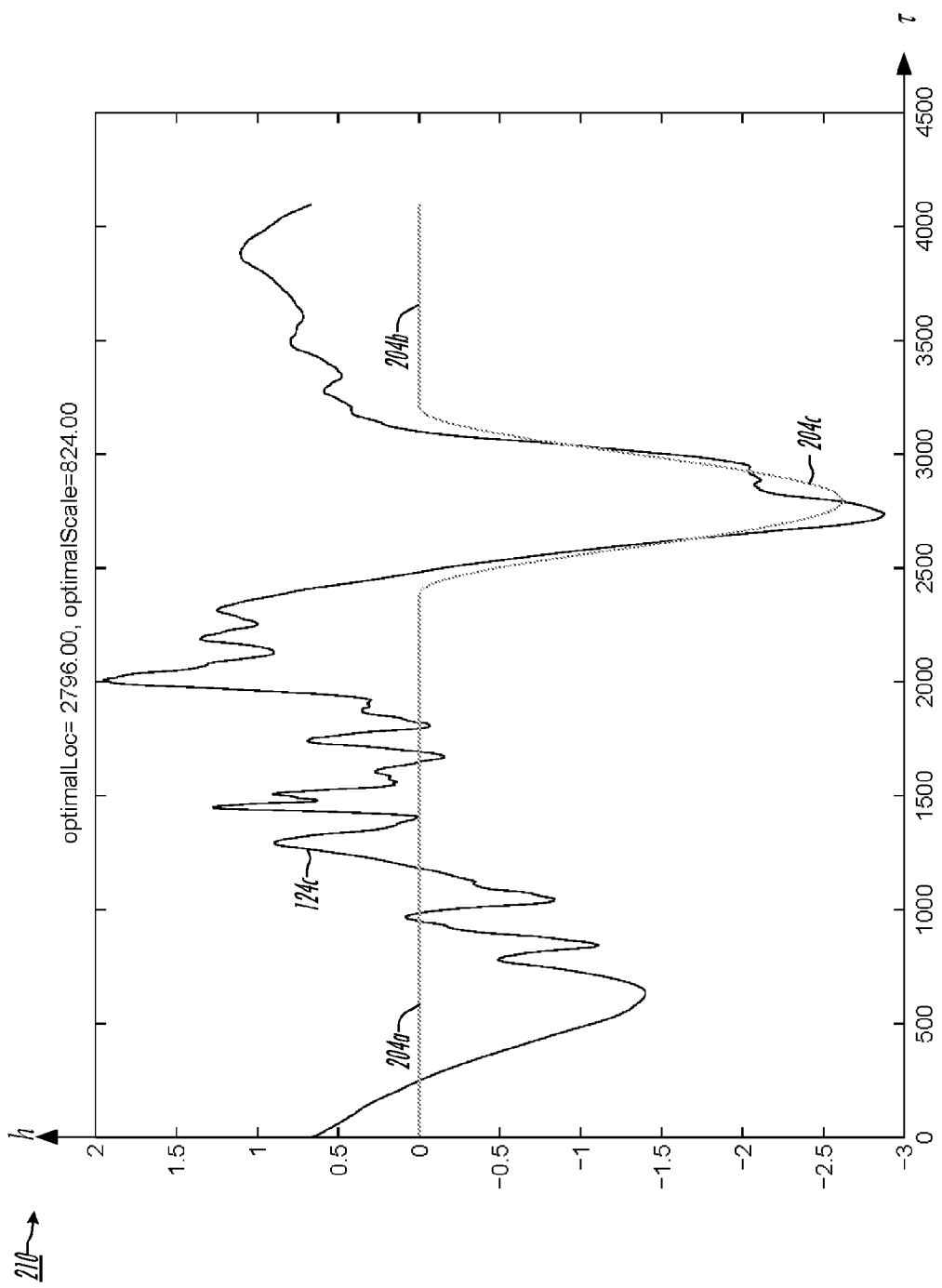
FIG. 7 is a graph showing an exemplary first iteration of a matching pursuit streak characterization identifying a first set of descriptor parameters for the raised cosine streak template that best fit the density profile of FIG. 6.
Figure 8:
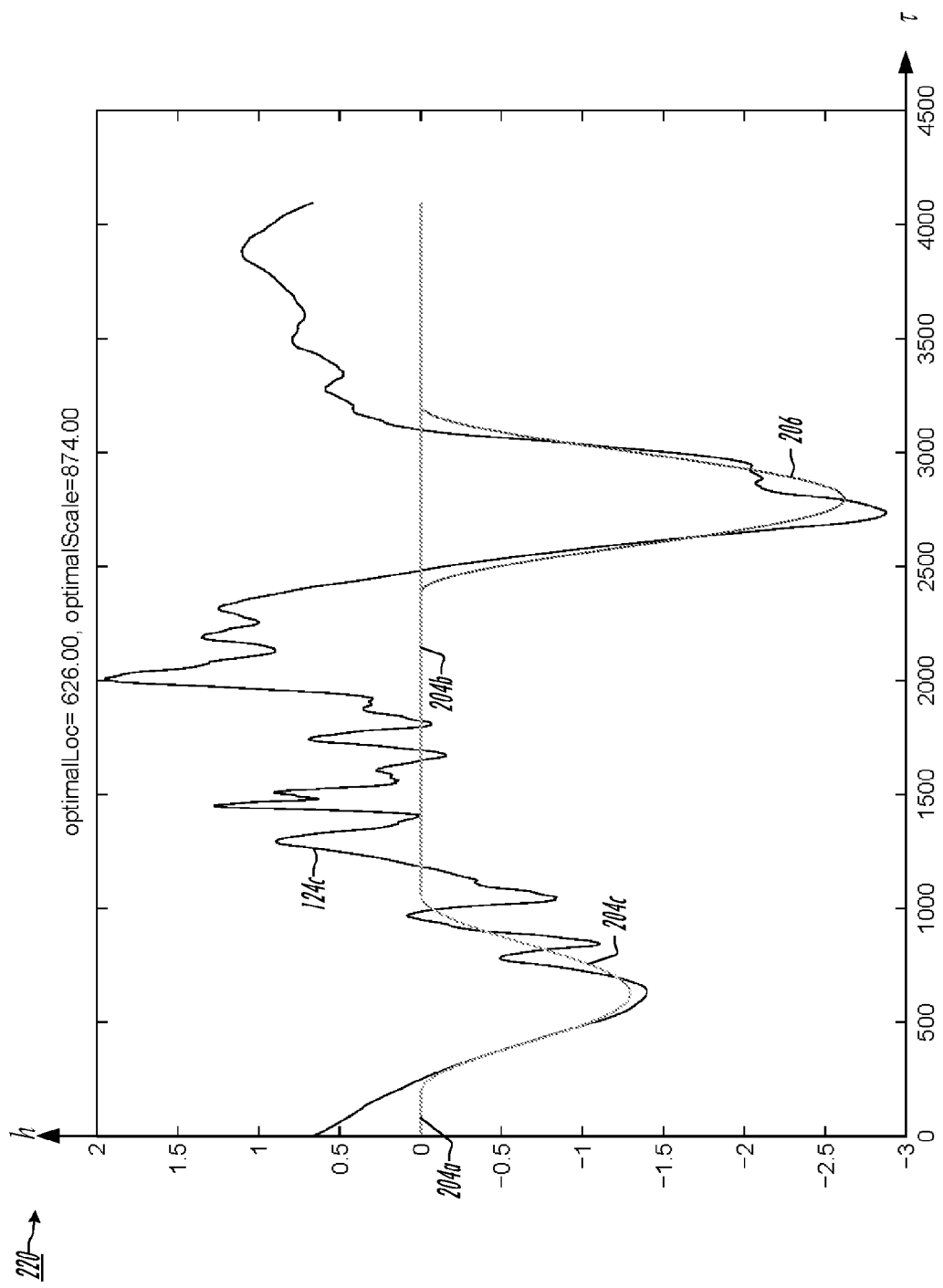
FIGS. 8-12 are graphs illustrating further iterations of the matching pursuit streak characterization identifying additional descriptor parameter sets for the density profile of FIG. 6.
Figure 9:
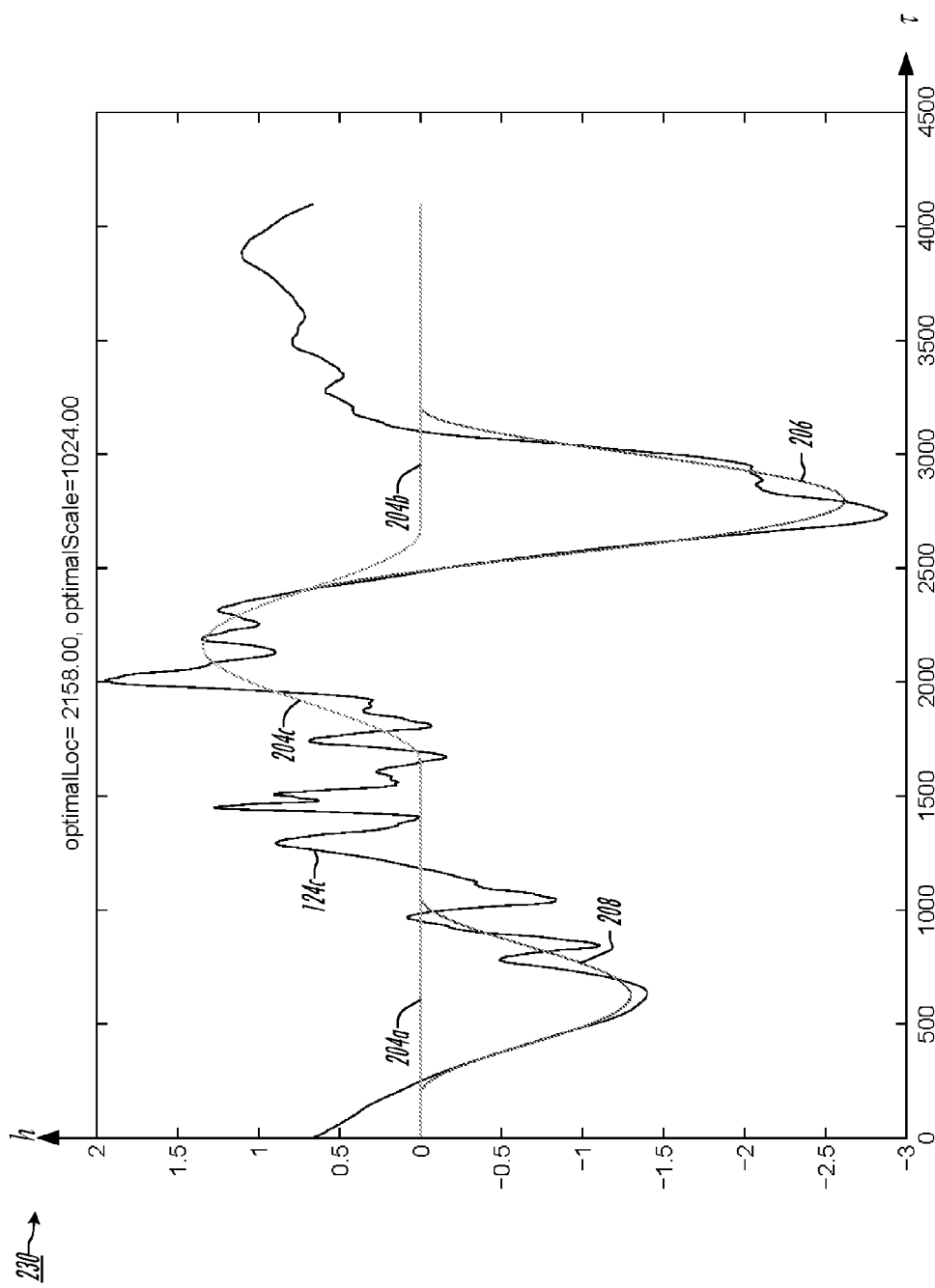

Referring also to FIG. 7, at 20 in FIG. 1, an iterative basis selection algorithm 124e is used to determine descriptor parameter sets 125a for the selected or preconfigured streak template x(t) 122c that best approximate the one-dimensional density profile 124c. The descriptor parameter sets 125a individually include a tuple describing a location parameter $\tau_i$ along the cross-process direction (x), a width parameter $\alpha_i$ along the cross-process direction (x), and a color value variation intensity parameter $h_i$ at the location $\tau_i$. FIG. 5 illustrates a graph 170 showing an exemplary raised cosine shaped streak template x(t) 122c with a raised half-cosine shape 204c of width $1/\alpha$ and a height h at a given location τ. The template 122c also includes horizontal portions 204a and 204b on either side of the raised cosine 204c. Using the raised cosine streak template x(t) 122c, the algorithm searches the possible values of the descriptor parameters $\tau_1$, $\alpha_1$, and $h_1$ to minimize the difference between the resulting template computation and the density profile 124c. FIG. 7 provides a graph 210 showing an exemplary first iteration of the matching pursuit streak characterization at 20 (FIG. 1) which identifies a first set of descriptor parameters $\tau_1$, $\alpha_1$, and $h_1$ for the raised cosine streak template that best fits the density profile 124c of FIG. 6.

Figure 10:
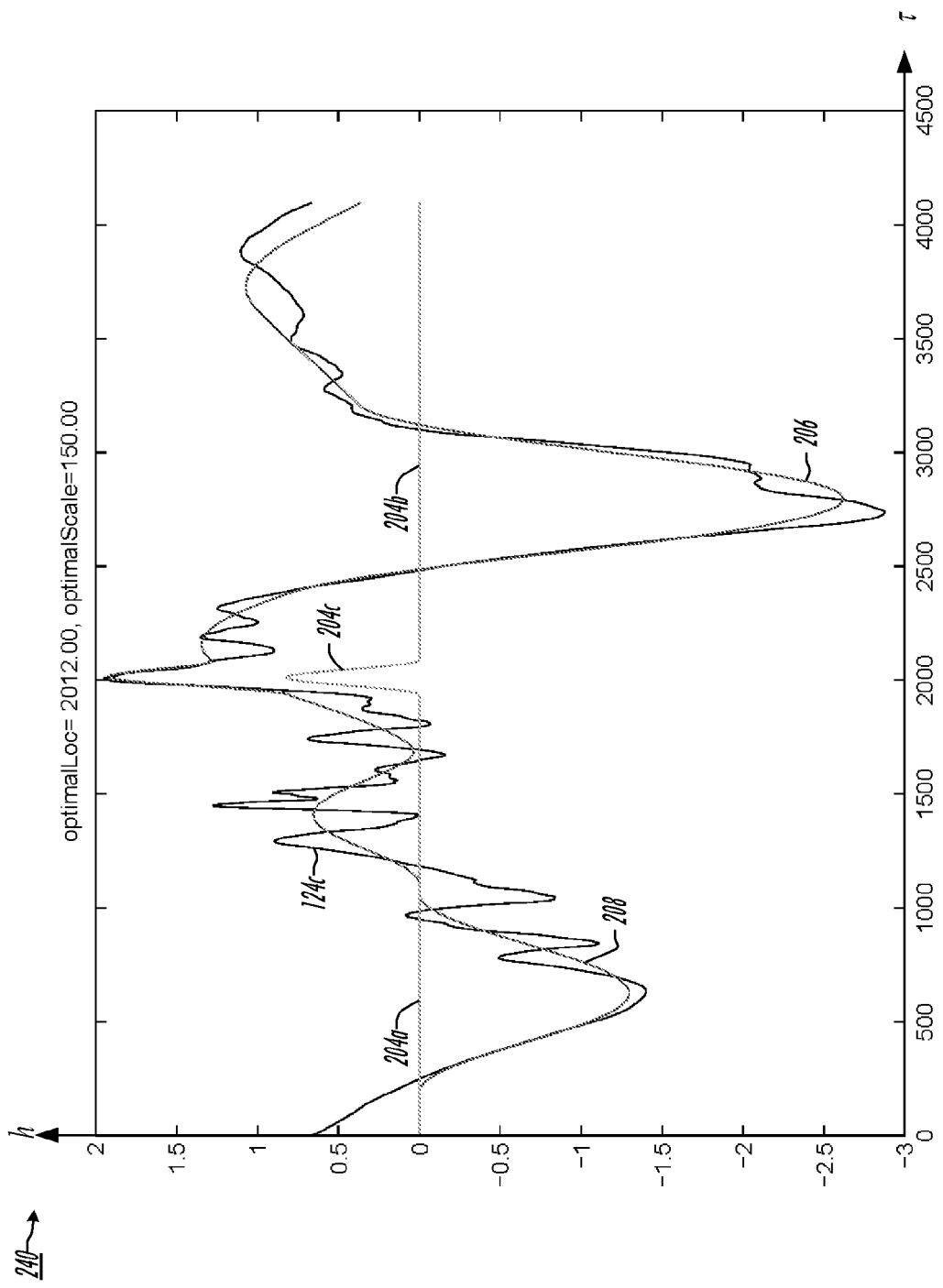
Figure 11:
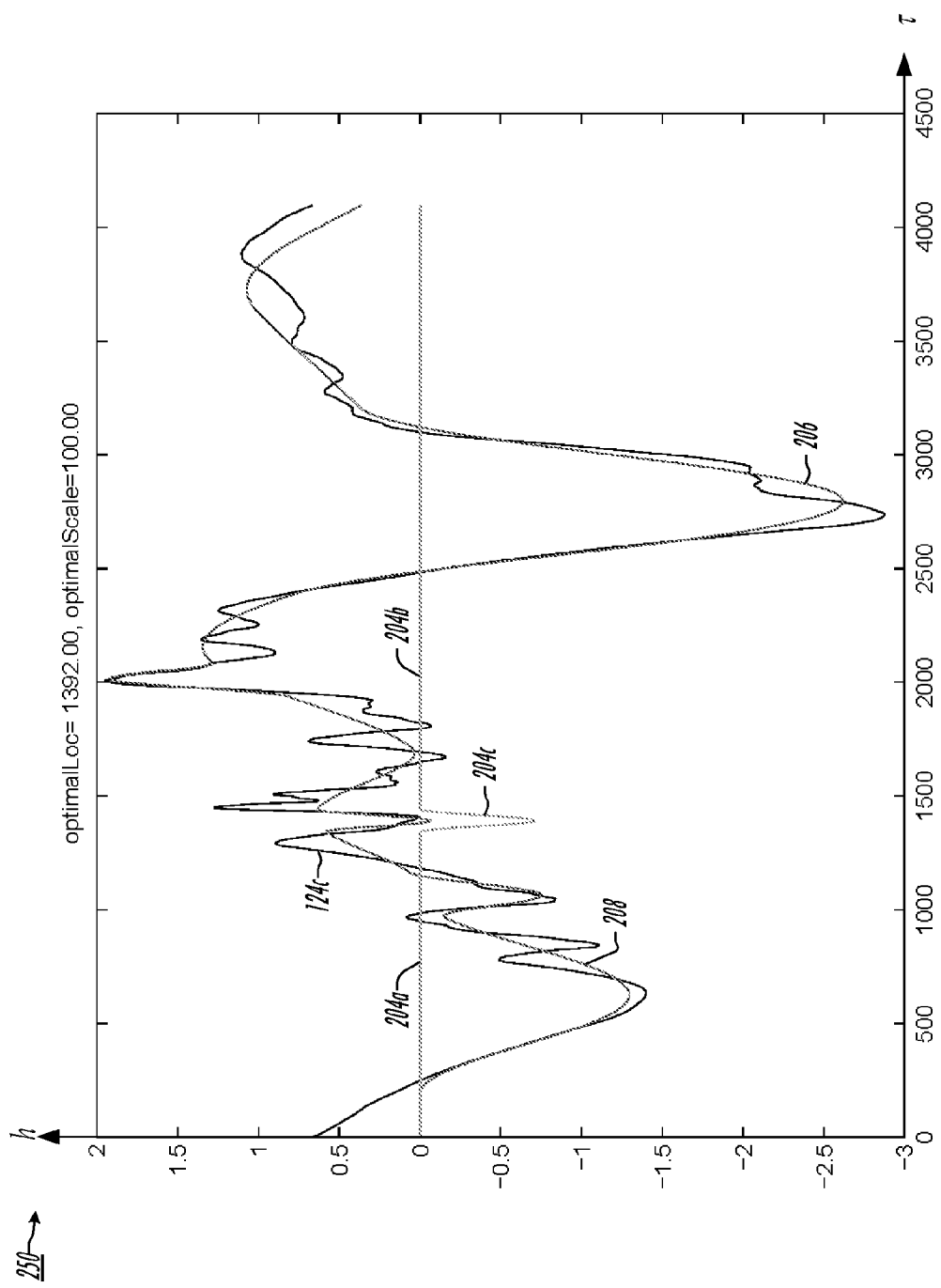
Figure 12:
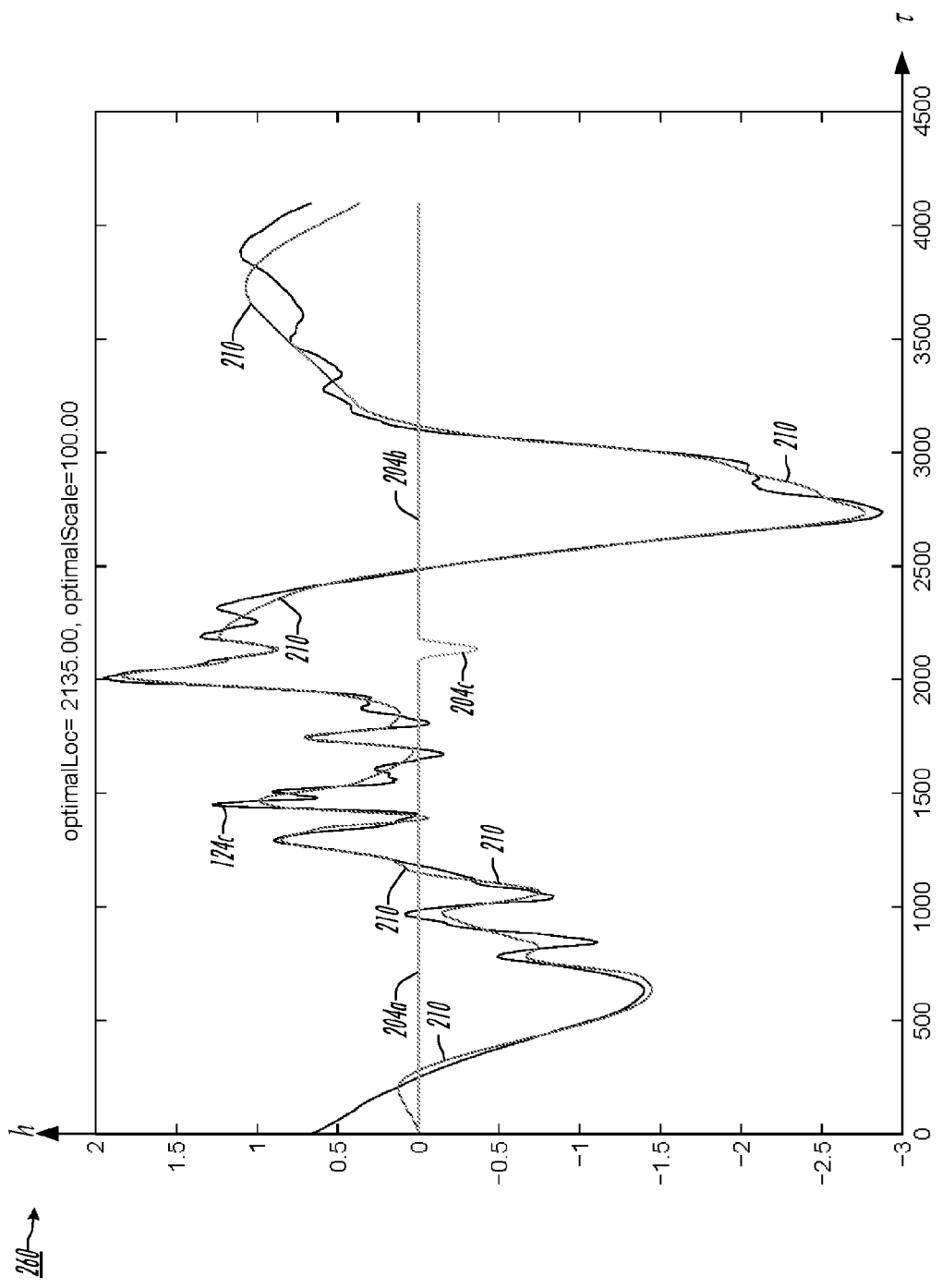

In one exemplary embodiment, a matching pursuit algorithm 124e1 is performed iteratively at 22 (alone or in combination with wavelet decomposition at 21), although other basis selection techniques can be used, such as basis pursuit 124e2 algorithms, etc. At 24, the one-dimensional density profile 124c is updated according to the streak template x(t) 122c and the descriptor parameter set 125a, and a determination is made at 26 as to whether the updated profile is sufficiently small or a threshold number of iterations have been performed. If not (NO at 26), the steps at 22 and 24 are repeated to determine further descriptor parameter sets 125a and to further update the one-dimensional density profile 124c. FIGS. 8-12 depict graphs 220, 230, 240, 250, and 260, respectively illustrating $2^{nd}$, $3^{rd}$, $7^{th}$, $9^{th}$, and $30^{th}$ iterations, respectively, of the matching pursuit streak characterization identifying additional descriptor parameter sets for the initial density profile 124c of FIG. 6. As seen in the $2^{nd}$ iteration of FIG. 8, the prior best fit 206 (determined in the $1^{st}$ iteration in FIG. 7) remains, while the raised cosine function with half-cosine portion 204c and horizontal portions 204a and 204b is shifted and stretched or squeezed to find the best fit for the residual or remainder (the updated density profile 124c), in this case to fit a streak at location τ=626. Upon a further iteration in the graph 230 of FIG. 9, this second best fit 208 remains with the first fit 206 and the template is again shifted and adjusted (portions 204a-204c) to find the best fit for the remainder profile. This process repeats as shown in FIGS. 10-12 to further refine the streak characterization.

Figure 13:
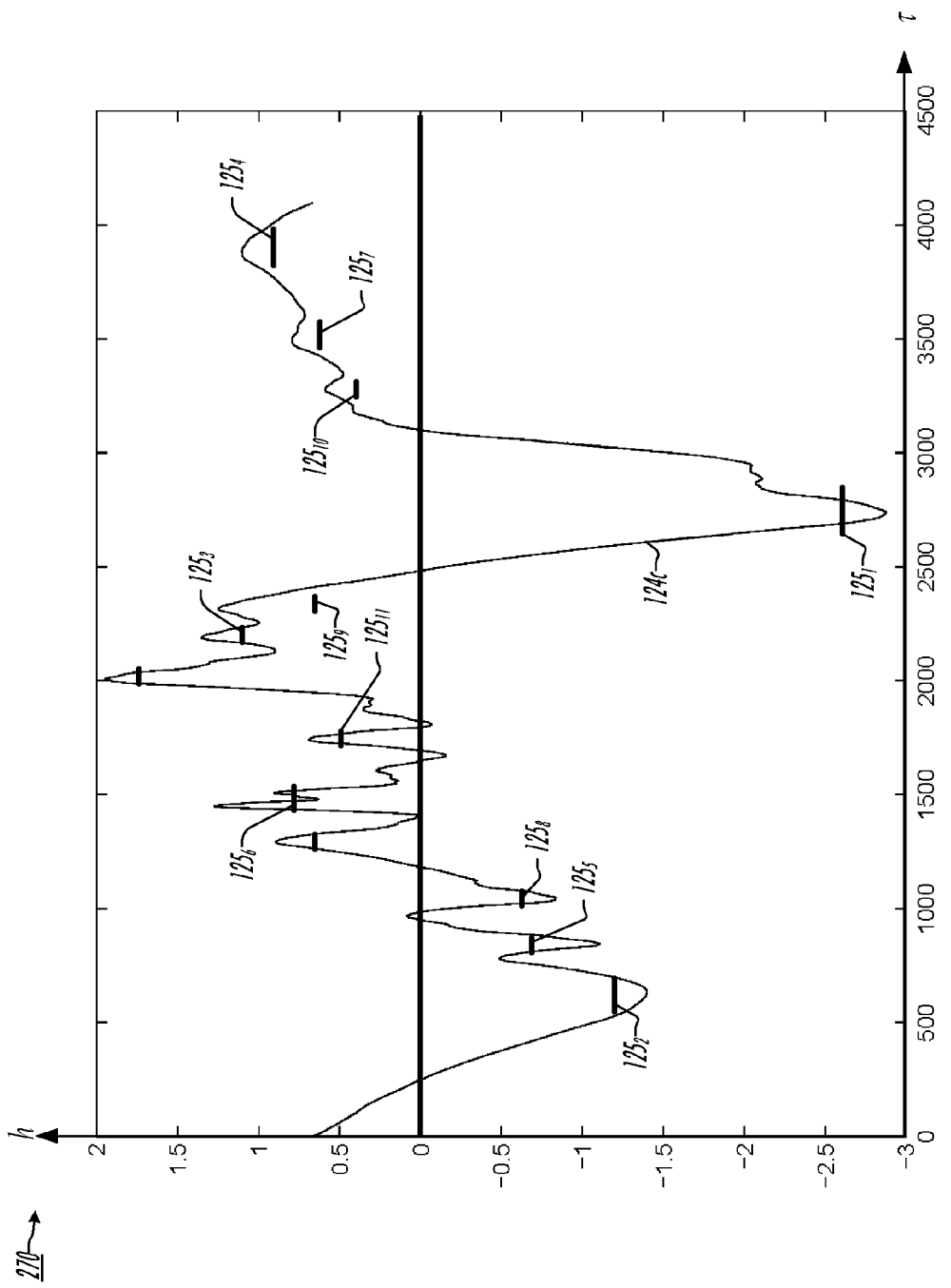
FIG. 13 is a graph showing a streak characterization for the density profile of FIG. 6, including estimates of a plurality of streaks characterized by a corresponding parameter set.

Once the streak characterization is finished (YES at 26 in FIG. 1), a printer streak characterization 125 is generated at 30 according to the streak template x(t) 122c and the descriptor parameter sets 125a, which may be provided to the diagnostic system or engine 128. As seen in graph 270 of FIG. 13, the printer streak characterization 125 includes estimates $125_i$ of a plurality of printer streaks 162 (exemplary estimates $125_1$-$125_{11}$ illustrated for illustrative purposes) individually characterized by a corresponding one of the descriptor parameter sets 125a (tuples $\tau_i$, $\alpha_i$, and $h_i$)). In this regard, the individual streak estimates are characterized according to the formula $h_i x(\alpha_i t - \tau$ where $\tau_i$ is the location parameter along the cross-process direction (x), $\alpha_i$ is the width parameter along the cross-process direction x, $h_i$ is the color value variation intensity parameter at the location $\tau_i$ and x(t) is the streak template. As seen in the streaked test image 162 in FIG. 2, and as represented by the estimates $125_i$ in FIG. 13, the process 2 characterizes differing variation intensities and widths of the streaks 164 found in the printer output sheet 160.

The following listing shows exemplary matching pursuit iterations:

Listing 1

```
xRec =0;
matchInfo= [ ] ; %matchInfo contains tuple [loc,scale,intensity]
for iter = 1 : maxIterNum
    % compute the best match
    % returns the projection signal optimalTemp, best match location, and scale
    [ optimalTemp , bestMatchLoc , optima l Scale ]= findBestTemplateMatch(XSignal) ;
    % add the matched template to the reconstruction signal
    xRec= xRec+ optimalTemp ;
    % record the descriptor (loc,scale,intensity)
    matchInfo= [ matchInfo; bestMatchLoc optimalScale optimalTemp (bestMatchLoc)];
    % subtract the matched template from the original signal
    XSigna l= XSignal-optimalTemp ( : ) ;
    if (norm( XSigna l )>energyThresh) % very little energy left
        break ;
    end
end
return ( matchInfo);
```

As previously mentioned, the descriptor parameter sets 125a may be determined at 20 for the streak template x(t) 122c using wavelet decomposition at 21. In these embodiments, the process at 21 includes performing a discrete wavelet decomposition 124/1 using the one-dimensional density profile 124c and a wavelet function ψ(t) 124d (e.g., wavelet functions 124d in FIGS. 14 and 15 below) to generate a location search range 124/2 for the location parameter $\tau_i$ and a width parameter search range 124/3 for the width parameter $\alpha_i$ along the cross-process direction (x). For each iteration in this case, the basis selection algorithm 124e at 22 is restricted according to the location search range 124/2 and the width parameter search range 124/3 to reduce the computation time. The discrete wavelet decomposition 124/1 includes computation of a projection of the one-dimensional density profile 124c onto the wavelet function ψ(t) 124d, for example, using the formula $\psi(2^k(t-\tau))$, where ψ(t) is the wavelet function 124d, where t and τ are discrete, and k is a decomposition level corresponding to a scale or width of $2^k$. Moreover, the wavelet function ψ(t) 124d in certain embodiments is selected or predefined to have a shape that is similar to the streak template x(t) 122c. For instance, the raised cosine streak template x(t) 122c (FIG. 5) can be used with the Mexican hat-shaped wavelet function ψ(t) 124d (302 in FIG. 14) as these have similar shapes.

The process 2 thus characterizes printing system streaks 164 in terms of cross-product direction location, width, and intensity by use of the mathematical parameterization: (τ, α, h), where τ denotes location, α denotes scale (inversely proportional to streak width), and h denotes intensity. The basis selection algorithm 20 (with or without wavelet decomposition 21) goal operates to extract a series of descriptor tuples $\{(\tau_i, \alpha_i, h_i)\}_{i=1, 2, \ldots, N}$ from the 1-D profile 124c f (t), which can be described as a series of superimposed streaks per the following equation:

$$f(t) = c + \sum_i h_i x(\alpha_i t - \tau_i), \qquad (1)$$

where c is a constant corresponding to the average intensity of the solid color test patch 162, and x(t) is the streak template 122c. As discussed above, the streak template x(t) 122c is stretched or squeezed in each iteration to proper width by the scale parameter $\alpha_i$, and shifted to location $\tau_i$. The color variation intensity is modified by the intensity or height parameter $h_i$. The best fit searching ideally locates tuples $(\tau_i, \alpha_i, h_i)$ such that the summation on the right-hand side of equation (1) matches with the observation profile 124c f (t). In this example, $\{x(a_i t-\tau_i)\}$ is a set of basis functions onto which the signal f(t) can be projected. In practice, the profile f(t) may be contaminated by noise and other printing and scanning artifacts. Hence, we would like to seek $\{(\tau_i, a_i, h_i)\}_{i=1, 2 \ldots, N}$ to minimize the discrepancy or error:

$$\varepsilon = \int_{t \in R} \left| f(t) - c - \sum_i h_i x(\alpha_i t - \tau_i) \right|^2 dt. \qquad (2)$$

The approach is capable of describing complicated streak artifacts, for instance, two narrow streaks on top of a wide streak, which can be estimated as the superimposition of three streaks, two with large $\alpha_i$ values, and one with small $\alpha_i$. Another advantage is its remarkable flexibility, with an operator only having to specify a single generic streak template 122c x(t) or this can be preconfigured for completely automated operation. The algorithm looks for the optimal set of instances $\{(\tau_i, \alpha_i, h_i)\}_{i=1, 2 \ldots, N}$ without requiring an operator or engineer to specify detailed streak information and without requiring pre-construction of any filterbanks as was the case with conventional streak detection techniques.

The computation intensity and non-uniqueness of the basis selection technique alone (e.g., the space of possible basis functions $\{x(\alpha t-\tau), \tau \in R, \alpha \in R^+\}$ is over-complete) can be addressed by using wavelett decomposition. The discrete wavelet transform (DWT) at 21 in FIG. 1 can advantageously speed up the search, where a signal is projected onto a complete and structured set of basis functions defined by the wavelet function $\psi(t)$ 124d. Particularly useful where the wavelet function is similar to the streak template streak template (x(t) 122c), the DWT is used to approximately match locations and scales to effectively truncate the search domain of $\tau$ and $\alpha$ from the entire plane (or half plane) to a much smaller neighborhood which can be searched directly. Furthermore, the DWT computation at 21 can be implemented using efficient and readily available algorithms.

The matching pursuit algorithm at 20 begins with the original profile signal 124c f(t) and finds the element g(t) in the search space which best matches with f(t). Given a template g(t), the best approximation or projection can be defined as:

$$f^{proj}(t) = \left\langle f(t), \frac{g(t)}{\|g(t)\|} \right\rangle \cdot \frac{g(t)}{\|g(t)\|}. \quad (3)$$

Here $<f,g>$ is the inner product and $\|g\|$ denotes a Euclidean norm. The matching error is $\epsilon_g = \|f - f^{proj}(t)\|$. The characterization system 124 in certain embodiments can search over all g(t) to minimize the matching error, and the density profile signal 124c f(t) is updated at 24 by the approximation residual:

$$f(t) \leftarrow f(t) - f^{proj}(t) = f(t) - \left\langle f(t), \frac{g(t)}{\|g(t)\|} \right\rangle \cdot \frac{g(t)}{\|g(t)\|} \quad (4)$$

The matching pursuit 20 is then iterated to search for the next best matching tuple and can be terminated at 26 when a maximal number of iterations is reached, or when the remainder signal f(t) contains very little energy. By progressively identifying the most dominant match, the signal representation will be sparse, and matching pursuit can successfully identify dominating basis.

The matching pursuit technique can be accelerated by using the discrete wavelet decomposition (DWT) at 21 to project f(t) onto the wavelet function 124d $\psi(2^k(t-\tau))$, where t and $\tau$ are discrete, and k is the decomposition level. The decomposition level k corresponds to a scale or width of $2^k$. In this respect, the wavelet function $\psi(t)$ is visually similar to streak template x(t). For instance, the Mexican hat and Daubechies wavelets of FIGS. 14 and 15 are similar to a raised cosine streak template and a triangle template, respectively, and the DWT can be computed quickly by convolving f(t) with filterbanks at dyadic scales, where the convolution can be efficiently implemented via fast Fourier transform (FFT).

Peaks and valleys of DWT at decomposition level k and location $\tau$ indicates that there is a good match between f(t) and the wavelet basis $\psi(2^k(t-\tau))$. Given the similarity between the wavelet function 124d $\psi(t)$ and the streak template 122c x(t), it is assumed that the match is also good between f(t) and $x(2^k(t-\tau))$, and thus DWT is indicative of potential streak locations and scales $(\tau,\alpha)$. Thus, rather than searching through all the possible elements in the $(\tau,\alpha)$ domain, DWT can be used to speed up for the optimal basis search at 20 by first identifying potential match locations and scales, and restricting the search to these search ranges. In certain embodiments, an N-level DWT is used at 21 in which the signal is decomposed into N+1 coarse-to-fine subbands. The coarsest subband is a low-pass version of f(t), while the finer subbands are the projection of f(t) onto the wavelet basis $\psi(2^k(t-\tau))$ for k=1, . . . , N. The projections have a finite support proportional to $2^k$. This subband structure provides a natural separation between baseline and streaks. N can be selected such that $2^N$ is roughly the support of the widest streaks 164. For instance, the 1-D profile 124c of FIG. 6 is 4096 pixel long, and thus N=10 which corresponds to streaks of width 1024, with anything wider being considered baseline instead of streaks 164. The baseline is obtained by reconstructing from the coarsest subband only.

The above described examples are merely illustrative of several possible embodiments of the present disclosure, wherein equivalent alterations and/or modifications will occur to others skilled in the art upon reading and understanding this specification and the annexed drawings. In particular regard to the various functions performed by the above described components (assemblies, devices, systems, circuits, and the like), the terms (including a reference to a "means") used to describe such components are intended to correspond, unless otherwise indicated, to any component, such as hardware, processor-executed software, or combinations thereof, which performs the specified function of the described component (i.e., that is functionally equivalent), even though not structurally equivalent to the disclosed structure which performs the function in the illustrated implementations of the disclosure. In addition, although a particular feature of the disclosure may have been disclosed with respect to only one of several embodiments, such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising". It will be appreciated that various of the above-disclosed and other features and functions, or alternatives thereof, may be desirably combined into many other different systems or applications, and further that various presently unforeseen or unanticipated alternatives, modifications, variations or improvements therein may be subsequently made by those skilled in the art which are also intended to be encompassed by the following claims.

The invention claimed is:

1. A method of characterizing printer streaks, the method comprising:
    (a) printing a test image onto a printable media according to an input characterization data set using a printing system;
    (b) measuring the test image to generate a characterization data set representing measurements of intensity or color values observed from the test image; and
    (c) generating a density profile using the characterization data set, the density profile representing intensity or color value variation of the test image in a cross-process direction transverse to a process direction of the printing system;

(d) using a processor, determining a descriptor parameter set for a streak template that best approximates the density profile using a basis selection algorithm, the descriptor parameter set including:
a location parameter along the cross-process direction, a width parameter along the cross-process direction, and an intensity parameter at the location;

(e) updating the density profile according to the streak template and the descriptor parameter set;
where updating the density profile according to the streak template and the descriptor parameter set comprises subtracting the streak template described using the descriptor parameter set from the current density profile;

(f) repeating steps (d) and (e) to determine at least a further descriptor parameter set and to further update the density profile; and (g) generating a printer streak characterization according to the streak template and the descriptor parameter sets.

2. The method of claim 1, where the descriptor parameter set is determined using a matching pursuit basis selection algorithm.

3. The method of claim 2, where determining the descriptor parameter set for a streak template comprises:
performing a discrete wavelet decomposition using the density profile and a wavelet function to generate:
a location search range for the location parameter along the cross-process direction, and
a width parameter search range for the width parameter along the cross-process direction; and
restricting the basis selection algorithm according to the location search range and the width parameter search range.

4. The method of claim 3, where performing the discrete wavelet decomposition comprises computing a projection of the density profile onto the wavelet function.

5. The method of claim 4, where the wavelet function has a shape that is similar to the streak template.

6. The method of claim 3, where the wavelet function has a shape that is similar to the streak template.

7. The method of claim 2, where the printer streak characterization comprises estimates of a plurality of printer streaks individually characterized by a corresponding one of the descriptor parameter sets.

8. The method of claim 7, where the individual streak estimates are characterized according to the following equation:

$$h_i x(\alpha_i t - \tau_i),$$

where $\tau_i$ is the location parameter along the cross-process direction, $\alpha_i$ is the width parameter along the cross-process direction, $h_i$ is the intensity parameter at the location $\tau_i$, and $x(t)$ is the streak template.

9. The method of claim 1, where the test image is printed according to an input characterization data set representing a uniform selected color or gray scale shade.

10. A method of characterizing printer streaks, the method comprising:
(a) printing a test image onto a printable media according to an input characterization data set using a printing system;
(b) measuring the test image to generate a characterization data set representing measurements of intensity or color values observed from the test image; and
(c) generating a density profile using the characterization data set, the density profile representing intensity or color value variation of the test image in a cross-process direction transverse to a process direction of the printing system;
(d) using a processor, determining a descriptor parameter set for a streak template that best approximates the density profile using a basis selection algorithm, the descriptor parameter set including:
a location parameter along the cross-process direction, a width parameter along the cross-process direction, and an intensity parameter at the location;
(e) updating the density profile according to the streak template and the descriptor parameter set;
(f) repeating steps (d) and (e) to determine at least a further descriptor parameter set and to further update the density profile; and
(g) generating a printer streak characterization according to the streak template and the descriptor parameter sets;
where determining the descriptor parameter set for a streak template comprises:
performing a discrete wavelet decomposition using the density profile and a wavelet function to generate:
a location search range for the location parameter along the cross-process direction, and
a width parameter search range for the width parameter along the cross-process direction; and
restricting the basis selection algorithm according to the location search range and the width parameter search range.

11. The method of claim 10, where the printer streak characterization comprises estimates of a plurality of printer streaks individually characterized by a corresponding one of the descriptor parameter sets.

12. The method of claim 11, where the individual streak estimates are characterized according to the following equation:

$$h_i x(\alpha_i t - \tau_i),$$

where $\tau_i$ is the location parameter along the cross-process direction, $\alpha_i$ is the width parameter along the cross-process direction, $h_i$ is the intensity parameter at the location $\tau_i$, and $x(t)$ is the streak template.

13. The method of claim 10, where performing the discrete wavelet decomposition comprises computing a projection of the density profile onto the wavelet function.

14. The method of claim 13, where the projection of the density profile onto the following wavelet function:

$$\psi(2^k(t-\tau)),$$

where $\psi(t)$ is the wavelet function (124d), where t and $\tau$ are discrete, and k is a decomposition level corresponding to a scale or width of $2^k$.

15. The method of claim 14, where the wavelet function has a shape that is similar to the streak template.

16. The method of claim 15, where the streak template is a raised cosine shape and where the wavelet function has a Mexican hat shape.

17. The method of claim 10, where the wavelet function has a shape that is similar to the streak template.

18. The method of claim 10, where the printer streak characterization comprises estimates of a plurality of printer streaks individually characterized by a corresponding one of the descriptor parameter sets.

19. The method of claim 18, where the individual streak estimates are characterized according to the following equation:

$$h_i x(\alpha_i t - \tau_i),$$

where $\tau_i$ is the location parameter along the cross-process direction, $\alpha_i$ is the width parameter along the cross-process direction, $h_i$ is the intensity parameter at the location $\tau_i$, and x(t) is the streak template.

20. The method of claim 10, where generating the density profile comprises averaging or integrating the characterization data set.

21. A printer streak characterization system for characterizing printer streaks, comprising:
a memory storing a characterization data set representing measurements of intensity or color values observed from a test image printed in a printable media; and
a processor operative to generate a density profile using the characterization data set, the density profile representing intensity or color value variation of the test image in a cross-process direction transverse to a process direction of the printing system;
the processor being operative to determine a descriptor parameter set for a streak template that best approximates the density profile using a basis selection algorithm, the descriptor parameter set including:
a location parameter along the cross-process direction,
a width parameter along the cross-process direction, and
an intensity parameter at the location;
the processor being operative to update the density profile according to the streak template and the descriptor parameter set;
the processor being operative to iteratively determine further descriptor parameter sets and to further update the density profile; and
the processor being operative to generate a printer streak characterization according to the streak template and the descriptor parameter set;
where the processor is operative to determine the descriptor parameter set for a streak template by performing a discrete wavelet decomposition using the density profile and a wavelet function to generate:
a location search range for the location parameter along the cross-process direction, and
a width parameter search range for the width parameter along the cross-process direction; and
where the processor is operative to restrict the basis selection algorithm according to the location search range and the width parameter search range.

22. The printer streak characterization system of claim 21, where the memory and the processor are integrated into a printing system, the printing system comprising:
at least one print engine operative to print the test image onto the printable media according to an input characterization data set; and
means for measuring the test image to generate the characterization data set representing measurements of intensity or color values observed from the test image.

23. The printer streak characterization system of claim 21, where the processor is operative to determine the descriptor parameter set using a matching pursuit basis selection algorithm.

24. The printer streak characterization system of claim 21, where the test image is printed according to an input characterization data set representing a uniform selected color or gray scale shade.

* * * * *